United States Patent [19]
Wakamatsu

[11] Patent Number: 6,011,666
[45] Date of Patent: Jan. 4, 2000

[54] DISK UNIT AND PORTABLE ELECTRONIC EQUIPMENT

[75] Inventor: Hiroaki Wakamatsu, Kawasaki, Japan

[73] Assignee: Fujitsu Limited, Kawasaki, Japan

[21] Appl. No.: 08/874,163

[22] Filed: Jun. 13, 1997

[30] Foreign Application Priority Data

Dec. 16, 1996 [JP] Japan .................................. 8-335579

[51] Int. Cl.⁷ .................................................. G11B 33/14
[52] U.S. Cl. .......................................... 360/69; 360/97.02
[58] Field of Search ................................ 360/69, 65, 75, 360/103, 97.02, 97.01; 369/44.11, 44.32, 112, 31

[56] References Cited

U.S. PATENT DOCUMENTS

| | | | |
|---|---|---|---|
| 5,012,360 | 4/1991 | Yamauchi et al. | 360/97.02 |
| 5,276,573 | 1/1994 | Harada et al. | 360/69 X |

FOREIGN PATENT DOCUMENTS

| | | |
|---|---|---|
| 54-614 | 1/1979 | Japan . |
| 55-48866 | 4/1980 | Japan . |
| 58-16837 | 1/1983 | Japan . |
| 63-117378 | 5/1988 | Japan . |
| 63-195893 | 8/1988 | Japan . |
| 63-273287 | 11/1988 | Japan . |
| 2-260183 | 10/1990 | Japan . |
| 4-325960 | 11/1992 | Japan . |
| 5-74129 | 3/1993 | Japan . |

*Primary Examiner*—Muhammad Edun
*Attorney, Agent, or Firm*—Greer, Burns & Crain, Ltd.

[57] ABSTRACT

A disk unit includes a mechanism which rotates a disk, a head which writes data to and/or reads data from the disk, a detection mechanism which detects an operating environment of the disk unit and outputs a detection signal, and a control unit which controls a floating distance of the head from the disk to more than a predetermined value by controlling the rotation mechanism and varying a rotational speed of the disk from a rated rotational speed if the detection signal falls outside a first range.

6 Claims, 15 Drawing Sheets

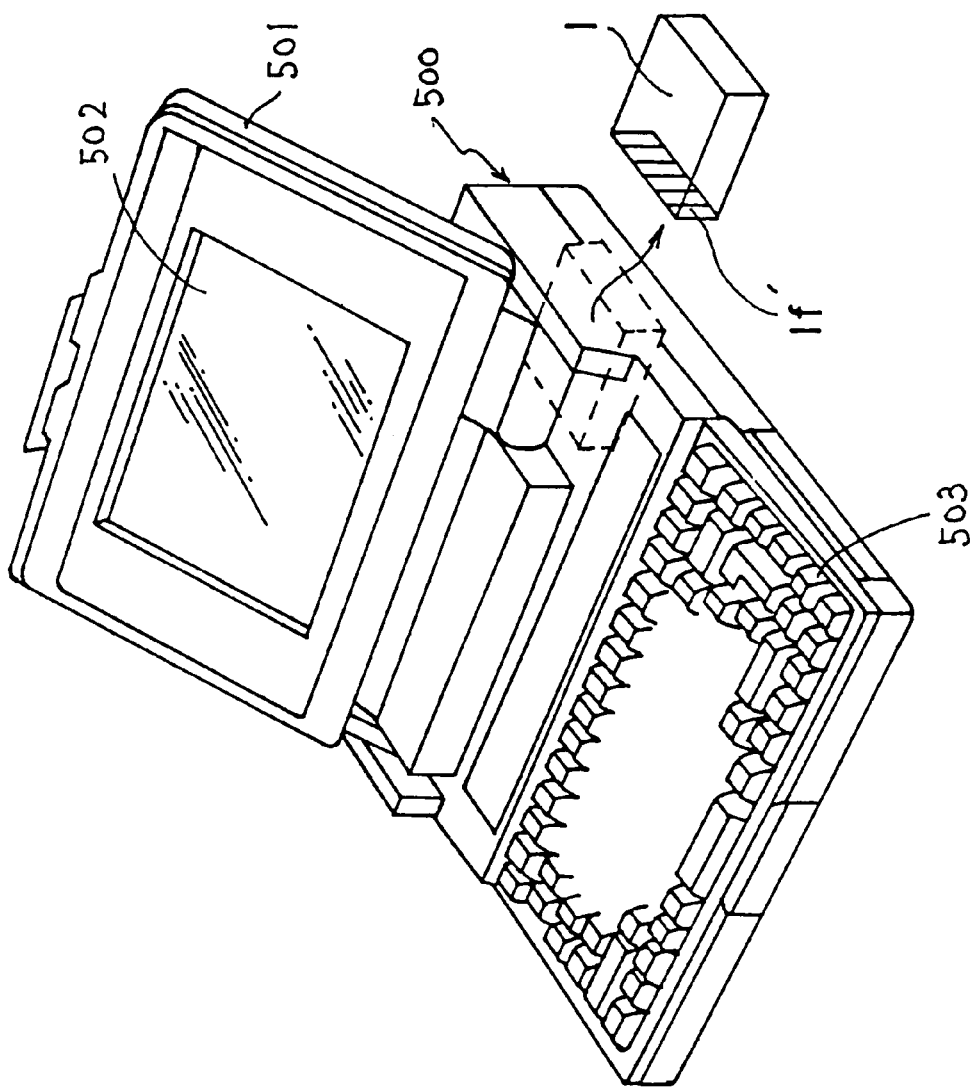

DISK UNIT AND PORTABLE ELECTRONIC EQUIPMENT

BACKGROUND OF THE INVENTION

The present invention generally relates to disk units and portable electronic equipment, and more particularly to disks unit and a portable electronic equipment which have a high reliability with respect to change in operating environment in which the disk units and the portable electronic equipment are used.

Recently, due to the increased amount of information processing in computer systems or the like, the amount of information written to and read from a magnetic disk unit has also increased, thereby increasing the memory capacity of the magnetic disk unit. On the other hand, in a magnetic disk unit used in a portable electronic equipment such as a lap-top personal computer, there are demands not only to increase the memory capacity, but also to reduce the size of the equipment and to enable easy operation of the equipment under various operating environments.

Conventionally, the magnetic disk unit was used under an operating environment which is restricted to a certain extent, such as in a computer room or on a desk top within an office. However, the size and weight of the electronic equipments such as the personal computer have been reduced considerably, resulting in more opportunities for the magnetic disk unit to be used under various operating environments.

Environmental factors affecting the reliability of the magnetic disk unit include the atmospheric pressure, temperature, humidity and the like. For example, the atmospheric pressure changes from that under the normal operating environment when the magnetic disk unit is used at a high-altitude location or within an airplane during flight.

The magnetic disk unit generally includes a magnetic disk which stores information, a magnetic head which writes information to and reads information from the magnetic disk, a positioning mechanism which moves the magnetic head to a desired position on the magnetic disk, and a motor which rotates the magnetic disk. When the environmental factors such as those described above change, the floating distance of the magnetic head from the magnetic disk decreases within the magnetic disk unit, and the possibility of the magnetic head contacting the magnetic disk increases. If the contact between the magnetic head and the magnetic disk is repeated over a long period of time, the magnetic head and the magnetic disk become damages, and the so-called head crash occurs whereby the information written on the magnetic disk is also destroyed.

The temperature and humidity under the operating environment of the magnetic disk unit are limited to certain ranges since the user who uses the magnetic disk unit can only work under limited environmental conditions. For this reason, it is unlikely that the magnetic disk unit will be used under extreme temperature and humidity conditions for a long period of time. However, the atmospheric pressure under which the magnetic disk unit is used may vary considerably. The atmospheric pressure at a high-altitude location or within the airplane during flight may vary in a range of approximately 0.7 to 0.8 standard atmosphere (atm), and the magnetic disk unit is often used under such pressure ranges. The atmospheric pressure greatly affects the floating distance of the magnetic head from the magnetic disk. Therefore, in addition to measures taken against temperature and humidity changes, it is desirable to take measures against the change in the atmospheric pressure.

Conventionally, various measures have been proposed against the change in the atmospheric pressure. A Japanese Laid-Open Patent Application No.54-614 proposes a method of adjusting the atmospheric pressure within the magnetic disk unit by providing a pressure adjusting bag. A Japanese Laid-Open Patent Application No.55-48866 proposes a method of controlling and stabilizing the pressure within the magnetic disk unit by providing a mechanism for controlling the mass of air flow. A Japanese Laid-Open Patent Application No.58-16837 proposes a method of balancing the pressure within the unit and the open air by use of an expanding and contracting bag. A Japanese Laid-Open Patent Application No.63-117378 proposes a method of providing an air pump which variably adjusts the pressure within the magnetic disk unit so that the shock when a magnetic head slides on a magnetic disk is reduced by increasing the pressure when stopping the rotation of the magnetic disk. A Japanese Laid-Open Patent Application No.2-260183 proposes a method similar to that proposed in the Japanese Laid-Open Patent Application No.63-117378. A Japanese Laid-Open Patent Application No.63-195893 proposes a method of providing a gas cylinder containing a high-pressure gas, so as to enable use of the unit under a low-pressure environment. In addition, a Japanese Laid-Open Patent Application No.5-74129 proposes a method of suppressing a pressure difference from being generated between the inside and the outside of the unit by using a bellows structure or a resilient body.

Basically, according to the above described units which have been proposed, a mechanism such as a pressure adjusting mechanism is additionally provided with respect to the unit, so as to return the operating environment to the original operating environment when the operating environment changes or, to minimize the change in the operating environment.

However, if an additional mechanism such as the pressure adjusting mechanism were provided on the magnetic disk unit, it would increase both the size and weight of the magnetic disk unit. As a result, it would be impossible to cope with the demands to reduce both the size and weight of the magnetic disk unit.

Also, if the additional mechanism such as the pressure adjusting mechanism were provided on the magnetic disk unit, it would increase the power consumption of the magnetic disk unit because the pressure adjusting mechanism or the like has a relatively large power consumption. As a result, it would be impossible to cope with the demands to reduce the power consumption of the portable electronic equipment which uses the magnetic disk unit.

SUMMARY OF THE INVENTION

Accordingly, it is a general object of the present invention to provide a novel and useful magnetic disk unit and portable electronic equipment, in which the problems described above are eliminated.

Another and more specific object of the present invention is to provide a disk unit and a portable electronic equipment which accepts an environmental change as it is, and minimizes damage to a head and a disk regardless of the environmental change.

Still another object of the present invention is to provide a disk unit comprising rotation means for rotating a disk, a head writing data to and/or reading data from the disk, detection means for detecting an operating environment of the disk unit and outputting a detection signal, and control means for controlling a floating distance of the head from the disk to more than a predetermined value by controlling the rotation means and varying a rotational speed of the disk from a rated rotational speed if the detection signal falls outside a first range. According to the disk unit of the present invention, it is possible to maintain the floating distance of the head from the disk to more than the predetermined value regardless of an environmental change, so that the damage to the head and the disk is minimized.

A further object of the present invention is to provide a disk unit comprising rotation means for rotating a disk, detection means for detecting an operating environment of the disk unit and outputting a first detection signal, and control means for controlling the rotation means and increasing a rotational speed of the disk from a rated rotational speed if the first detection signal falls outside a first range. According to the disk unit of the present invention, the contact frequency and the contact strength of the head and the disk caused by an environmental change are reduced regardless of the environmental change, so that the damage to the head and the disk is minimized.

Another object of the present invention is to provide a disk unit comprising rotation means for rotating a disk, detection means for detecting an operating environment of the disk unit and outputting a first detection signal, and control means for controlling the rotation means and decreasing a rotational speed of the disk from a rated rotational speed if the first detection signal falls outside a first range. According to the disk unit of the present invention, the contact frequency and the contact strength of the head and the disk caused by an environmental change are reduced regardless of the environmental change, so that the damage to the head and the disk is minimized.

Still another object of the present invention is to provide a disk unit comprising a head writing data to and/or reading data from a disk, detection means for detecting an operating environment of the disk unit and outputting a first detection signal, moving means for moving the head approximately in a radial direction of the disk, and control means for controlling the moving means to recede the head to a predetermined region of the disk during a mode other than the read and the write if the first detection signal falls outside a first range. According to the disk unit of the present invention, it is possible to prevent a specific region of the disk from becoming easily damaged.

A further object of the present invention is to provide a disk unit comprising a disk enclosure accommodating a disk and having a breathing hole which communicates to outside the disk enclosure, detection means for detecting an operating environment of the disk unit and outputting a detection signal, a mechanism opening and closing the breathing hole, and means for controlling the mechanism to close the breathing hole if the detection signal falls outside a first range. According to the disk unit of the present invention, it is possible to reduce the contact frequency and the contact strength of the head and the disk by maintaining the pressure within the disk unit with respect to a surrounding pressure decrease, so that the damage to the head and the disk is minimized regardless of the environmental change.

Another object of the present invention is to provide a portable electronic equipment comprising a display unit, a keyboard, and a disk unit comprising rotation means for rotating a disk, a head writing data to and/or reading data from the disk, detection means for detecting an operating environment of the disk unit and outputting a detection signal, and control means for controlling a floating distance of the head from the disk to more than a predetermined value by controlling the rotation means and varying a rotational speed of the disk from a rated rotational speed if the detection signal falls outside a first range. According to the portable electronic equipment of the present invention, it is possible to maintain the floating distance of the head from the disk to more than the predetermined value regardless of an environmental change, so that the damage to the head and the disk is minimized.

Still another object of the present invention is to provide a portable electronic equipment comprising a display unit, a keyboard, and a disk unit comprising rotation means for rotating a disk, detection means for detecting an operating environment of the disk unit and outputting a first detection signal, and control means for controlling the rotation means and increasing a rotational speed of the disk from a rated rotational speed if the first detection signal falls outside a first range. According to the portable electronic equipment of the present invention, the contact frequency and the contact strength of the head and the disk caused by an environmental change are reduced regardless of the environmental change, so that the damage to the head and the disk is minimized.

A further object of the present invention is to provide a portable electronic equipment comprising a display unit, a keyboard, and a disk unit comprising rotation means for rotating a disk, detection means for detecting an operating environment of the disk unit and outputting a first detection signal, and control means for controlling the rotation means and decreasing a rotational speed of the disk from a rated rotational speed if the first detection signal falls outside a first range. According to the portable electronic equipment of the present invention, the contact frequency and the contact strength of the head and the disk caused by an environmental change are reduced regardless of the environmental change, so that the damage to the head and the disk is minimized.

Another object of the present invention is to provide a portable electronic equipment comprising a display unit, a keyboard, and a disk unit comprising a head writing data to and/or reading data from a disk, detection means for detecting an operating environment of the disk unit and outputting a first detection signal, moving means for moving the head approximately in a radial direction of the disk, and control means for controlling the moving means to recede the head to a predetermined region of the disk during a mode other than the read and the write if the first detection signal falls outside a first range. According to the portable electronic equipment of the present invention, it is possible to prevent a specific region of the disk from becoming easily damaged.

Still another object of the present invention is to provide a portable electronic equipment comprising a display unit, a keyboard, and a disk unit comprising a disk enclosure accommodating a disk and having a breathing hole which communicates to outside the disk enclosure, detection means for detecting an operating environment of the disk unit and outputting a detection signal, a mechanism opening and closing the breathing hole, and means for controlling the mechanism to close the breathing hole if the detection signal falls outside a first range. According to the portable electronic equipment of the present invention, it is possible to reduce the contact frequency and the contact strength of the head and the disk by maintaining the pressure within the disk unit with respect to a surrounding pressure decrease, so that the damage to the head and the disk is minimized regardless of the environmental change. Other objects and further features of the present invention will be apparent from the following detailed description when read in conjunction with the accompanying drawings.

BRIEF DESCRIPTION OF THE DRAWINGS

FIG. 16 is a perspective view showing the external appearance of an embodiment of a portable electronic equipment according to the present invention.

DESCRIPTION OF THE PREFERRED EMBODIMENTS

Figure 1:
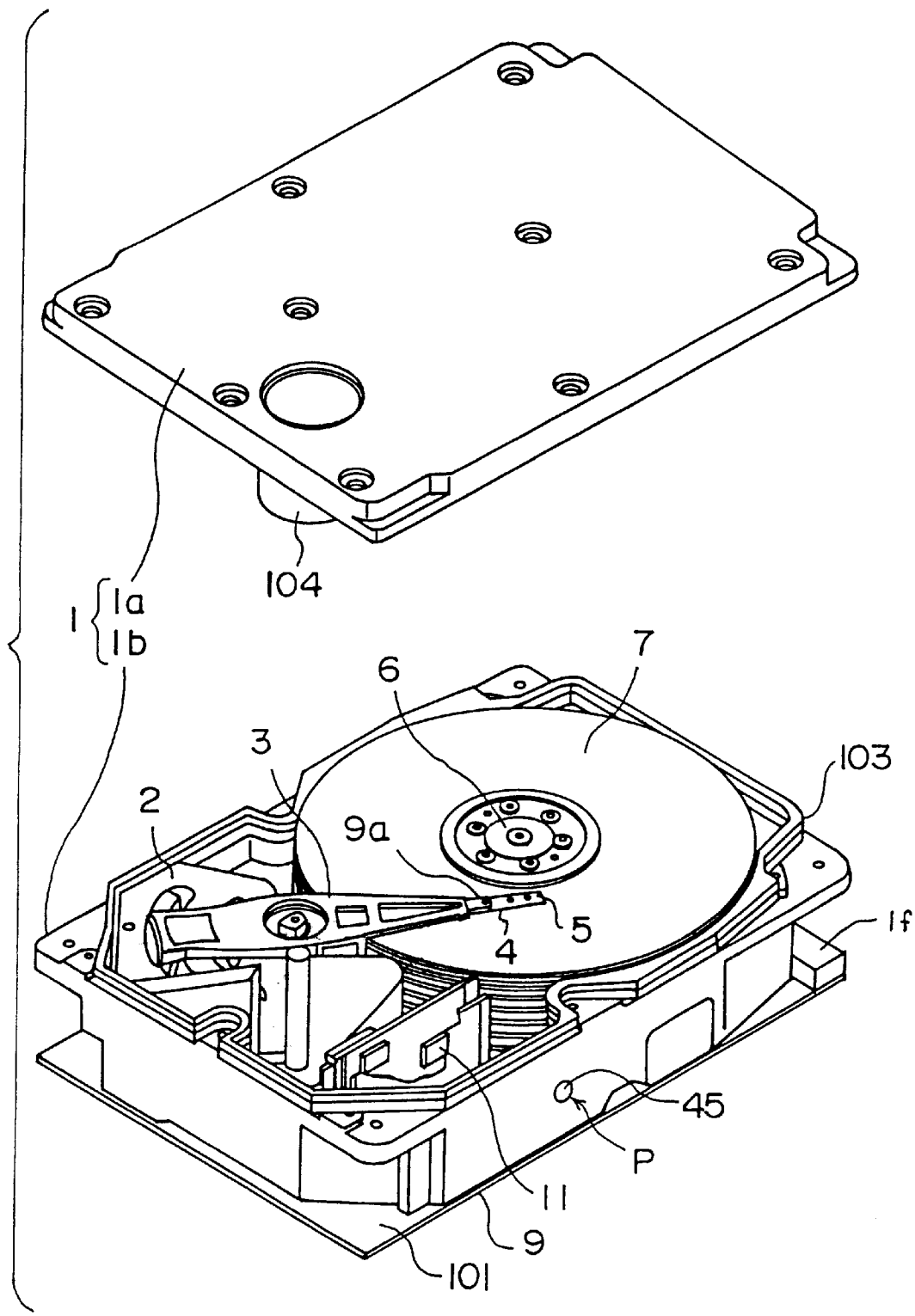
FIG. 1 is a perspective view, with a cover removed, showing a mechanical part of a first embodiment of a disk unit according to the present invention.

A disk unit according to the present invention and a portable electronic equipment according to the present invention having such a disk unit, respectively are constructed to accept an environmental change and to minimize damage to a head and a disk regardless of the environmental change, by reducing a frequency of contact between the head and the disk due to the environmental change or by reducing a strength of contact between the head and the disk due to the environmental change. For this reason, there is basically no need to additionally provide a special mechanism that is bulky, heavy and has a large power consumption as in the conventional case, in order to reduce the contact frequency and the contact strength of the head and the disk. In the present invention, the contact frequency and the contact strength of the head and the disk can be reduced by a simple partial modification of parts forming the disk unit, a simple partial modification of the firmware or the like.

More particularly, the present invention provides functions or measures such as (a) increasing the rotational speed of the disk, (b) decreasing the rotational speed of the disk, (c) controlling the head to carry out a seek operation, (d) making the head recede to a position where the floating distance of the head from the disk becomes a maximum, (e) providing on the disk a region having a high contact withstand characteristic such that the region can withstand contact to a certain extent or a region having a low contact frequency, (f) stopping the rotation of the disk, and (g) blocking a breathing hole in a disk enclosure to suppress decrease of the atmospheric pressure.

(a) By providing the function of increasing the rotational speed of the disk, it is possible to increase the floating distance of the head from the disk, thereby decreasing the contact frequency and the contact strength of the head and the disk.

(b) By providing the function of decreasing the rotational speed of the disk, the locations where the head and the disk make contact increases, but the damage caused by the contact is reduced, and it is possible to prevent a portion of the disk from being greatly damaged.

(c) By providing the function of controlling the head to carry out the seek operation, the portion of the disk contacted by the head constantly varies, and it is possible to prevent a portion of the disk from being greatly damaged continuously along a peripheral direction of the disk. In addition, by additionally providing the function of varying the rotational speed of the disk during the seek operation, it is also possible to reduce the contact frequency of the head and the disk.

(d) By providing the function of making the head recede to the position where the floating distance of the head from the disk becomes a maximum, it is possible to reduce the contact frequency and the contact strength of the head and the disk.

(e) By taking the measures to provide on the disk the region having a high contact withstand characteristic such that the region can withstand contact to a certain extent or the region having a low contact frequency, it is possible to suppress the damage to the head and the disk.

(f) By providing the function of stopping the rotation of the disk, it is possible to suppress the damage caused by the contact between the head and the disk.

(g) By providing the function of blocking the breathing hole in the disk enclosure to suppress decrease of the atmospheric pressure, it is possible to suppress the damage caused by the contact between the head and the disk.

Therefore, the present invention can effectively prevent the generation of the head crash.

FIG. 1 is a perspective view, with a cover removed, showing a mechanical part of a first embodiment of a disk unit according to the present invention. This first embodiment of the disk unit is applied to a first embodiment of a portable electronic equipment according to the present invention. In the embodiments described hereinafter, the present invention is applied to a magnetic disk unit.

A magnetic disk unit shown in FIG. 1 generally includes a disk enclosure 1 made up of a cover 1a and a base 1b, an interface 1f, a head positioning mechanism 2, a head arm 3, a head suspension 4 connected to the head arm 3, a magnetic head 5 supported on the head arm 3 via the head suspension 4, a magnetic disk 7 mounted on a spindle 6, a sensor group 9, a head integrated circuit (IC) 11, a printed circuit 101, a packing 103, and a desiccating agent 104. The spindle 6 is rotated by a spindle motor which is not visible in FIG. 1.

In this embodiment, the sensor group 9 is provided on the printed circuit 101. However, the sensor group 9 may be provided on the head IC 11 or at other locations which do not interfere with the operations of other mechanisms within the magnetic disk unit. When a plurality of disks 7 are provided as shown in FIG. 1, a plurality of head positioning mechanisms 2, a plurality of head arms 3, a plurality of head suspensions 4 and a plurality of magnetic heads 5 are provided. In addition, as will be described later, the sensor group 9 is made up of one or a plurality of sensors.

Known parts may be used for the various parts forming the magnetic disk unit shown in FIG. 1, except for the sensor group 9 which is not provided in a known magnetic disk unit.

Figure 2:
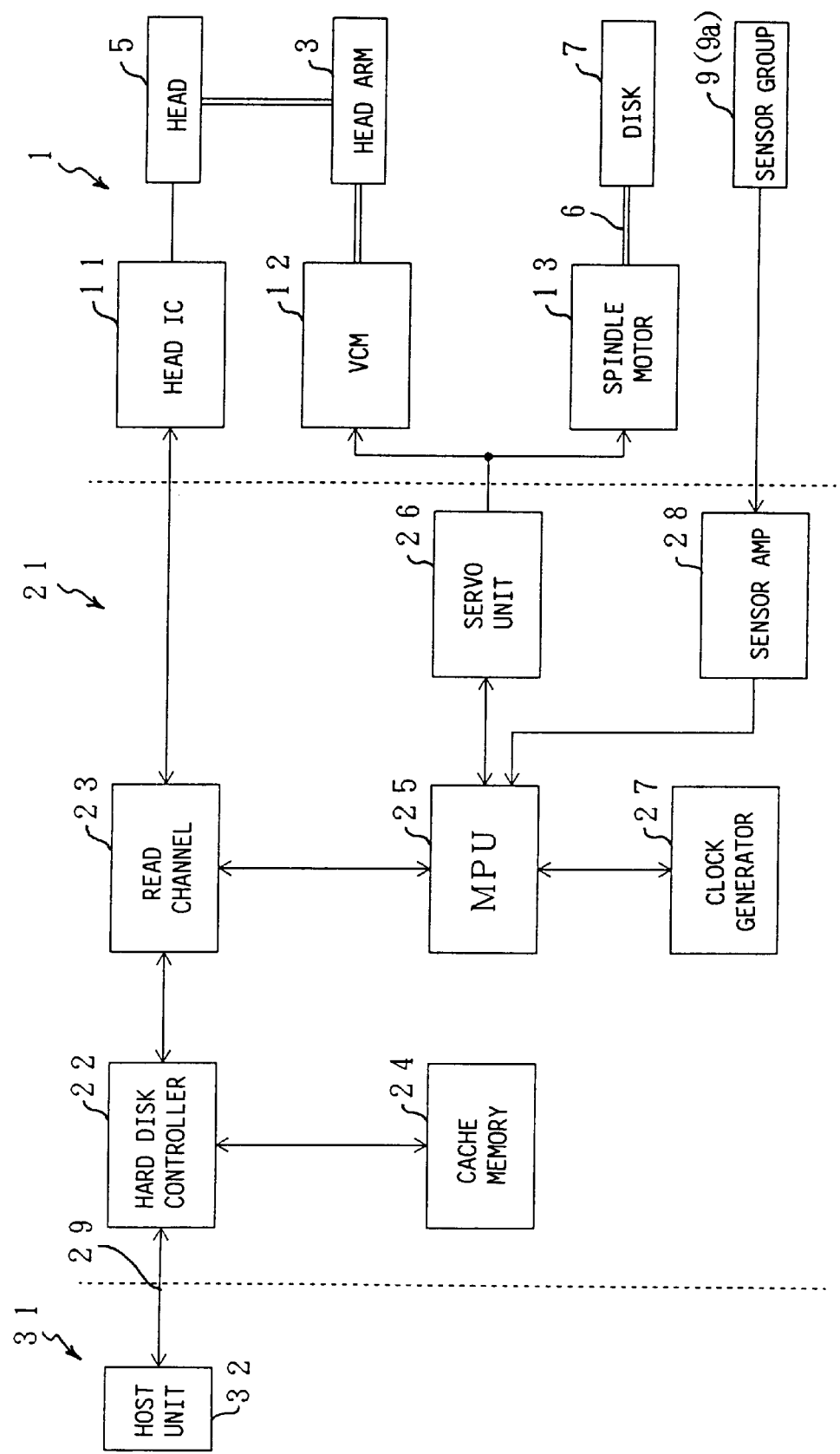
FIG. 2 is a system block diagram showing the construction of the first embodiment of the disk unit in more detail.

FIG. 2 is a system block diagram showing the construction of the first embodiment of the disk unit in more detail. In FIG. 2, those parts which are the same as those corresponding parts in FIG. 1 are designated by the same reference numerals, and a description thereof will be omitted. In the first embodiment of the portable electronic equipment, the present invention is applied to a portable personal computer which is often referred to as a lap-top personal computer.

In FIG. 2, the magnetic disk unit includes the disk enclosure 1 and a control unit 21. In addition to the parts shown in FIG. 1, a head integrated circuit (IC) 11, a voice coil motor 12, a spindle motor 13 and the like are provided within the disk enclosure 1. In addition, the control unit 21 includes a hard disk controller 22, a read channel 23, a cache memory 24, a microprocessor unit (MPU) 25, a servo unit 26, a clock generator 27 and a sensor amplifier 28 which are connected as shown in FIG. 2. A part of or, all of the control unit 21, may be provided on the printed circuit 101 shown in FIG. 1.

A host part 31 includes a host unit 31 which controls the entire operation of the portable electronic equipment. The host unit 32 is coupled to the hard disk controller 22 of the control unit 21 via an interface 29. The host unit 32 includes an input device such as a keyboard and a display unit such as a liquid crystal display, however, the illustration thereof is omitted for the sake of convenience.

When driving data to the magnetic disk 7, the hard disk controller 22 of the control unit 21 receives a write instruction and write data from the host unit 32 via the interface 29. The write data are temporarily stored in the cache memory 24 which is used as a buffer memory. The write instruction is supplied to the MPU 25 via the hard disk controller 22. Based on a clock from the clock generator 27, the MPU 25 controls the voice coil motor 12 and the spindle motor 13 via the servo unit 26. As a result, the magnetic head 5 is moved to a desired track position on the magnetic disk 7 by the head arm 3, and the magnetic disk 7 is rotated at a rated rotational speed by the spindle 6 which is driven by the spindle motor 13. The rated rotational speed refers to a rotational speed of the magnetic disk 7 with which the magnetic disk unit can exhibit its original performance under normal operating conditions which are determined in advance, where the normal operating conditions include an atmospheric pressure of approximately 1 atm and room temperature. Under the normal operating conditions, the writing of the data to and the reading of the data from the magnetic disk 7 are normally carried out at the rated rotational speed.

On the other hand, the write data are read from the cache memory 24 and are supplied to the read channel 23 via the hard disk controller 22. The read channel 23 encodes the write data under the control of the MPU 25, and supplies the encoded write data to the head IC 11. The head IC 11 writes the encoded write data on the magnetic disk 7 by the magnetic head 5.

When reading data from the magnetic disk 7, the hard disk controller 22 of the control unit 21 receives a read instruction from the host unit 32 via the interface 29. The read instruction is supplied to the MPU 25 via the hard disk controller 22. The read instruction is supplied to the MPU 25 via the hard disk controller 22. Based on a clock from the clock generator 27, the MPU 25 controls the voice coil motor 12 and the spindle motor 13 via the servo unit 26. Hence, the magnetic head 5 is moved to a desired track position on the magnetic disk 7 by the head arm 3, and the magnetic disk 7 is rotated at the rated rotational speed by the spindle 6 which is driven by the spindle motor 13.

On the other hand, the data read from the magnetic disk 7 by the magnetic head 5 are supplied to the read channel 23 via the head IC 11. The read channel 23 decodes the read data under the control of the MPU 25, and generates read data. The read data are supplied from the read channel 23 to the hard disk controller 22 under the control of the MPU 25, and are temporarily stored in the cache memory 24. The read data read from the cache memory 24 are supplied to the host unit 32 from the hard disk controller 22 via the interface 29.

The spindle motor 13 has a capacity such that the spindle motor 13 is capable of rotating at a rotational speed higher than the rated rotational speed.

The sensor group 9 includes at least one sensor for detecting the operating environment of the magnetic disk unit, selected from a group of sensors consisting of a barometric sensor, a temperature sensor, a humidity sensor, a piezoelectric sensor, an ultrasonic sensor and a dust sensor. A detection signal output from each sensor of the sensor group 9 is amplified by the sensor amplifier 28 and is supplied to the MPU 25. The MPU 25 takes measures to reduce the contact frequency or the contact strength of the magnetic head 5 and the magnetic disk 7 depending on the environmental change, based on one or more detection signals from one or more sensors of the sensor group 9 which are received via the sensor amplifier 28. As a result, the damage to the magnetic head 5 and the magnetic disk 7 is minimized regardless of the environmental change.

Of course, the location of the sensor group 9 within the disk enclosure 1 is not limited to that shown in FIG. 1. In addition, the sensors of the sensor group 9 need not be gathered and arranged at one location, and may be arranged at different locations within the disk enclosure 1. Furthermore, needless to say, each sensor of the sensor group 9 is arranged at a location which does not interfere with the operations of the various mechanisms of the magnetic disk unit and is suited for detecting an environmental parameter such as the atmospheric pressure.

Figure 3:
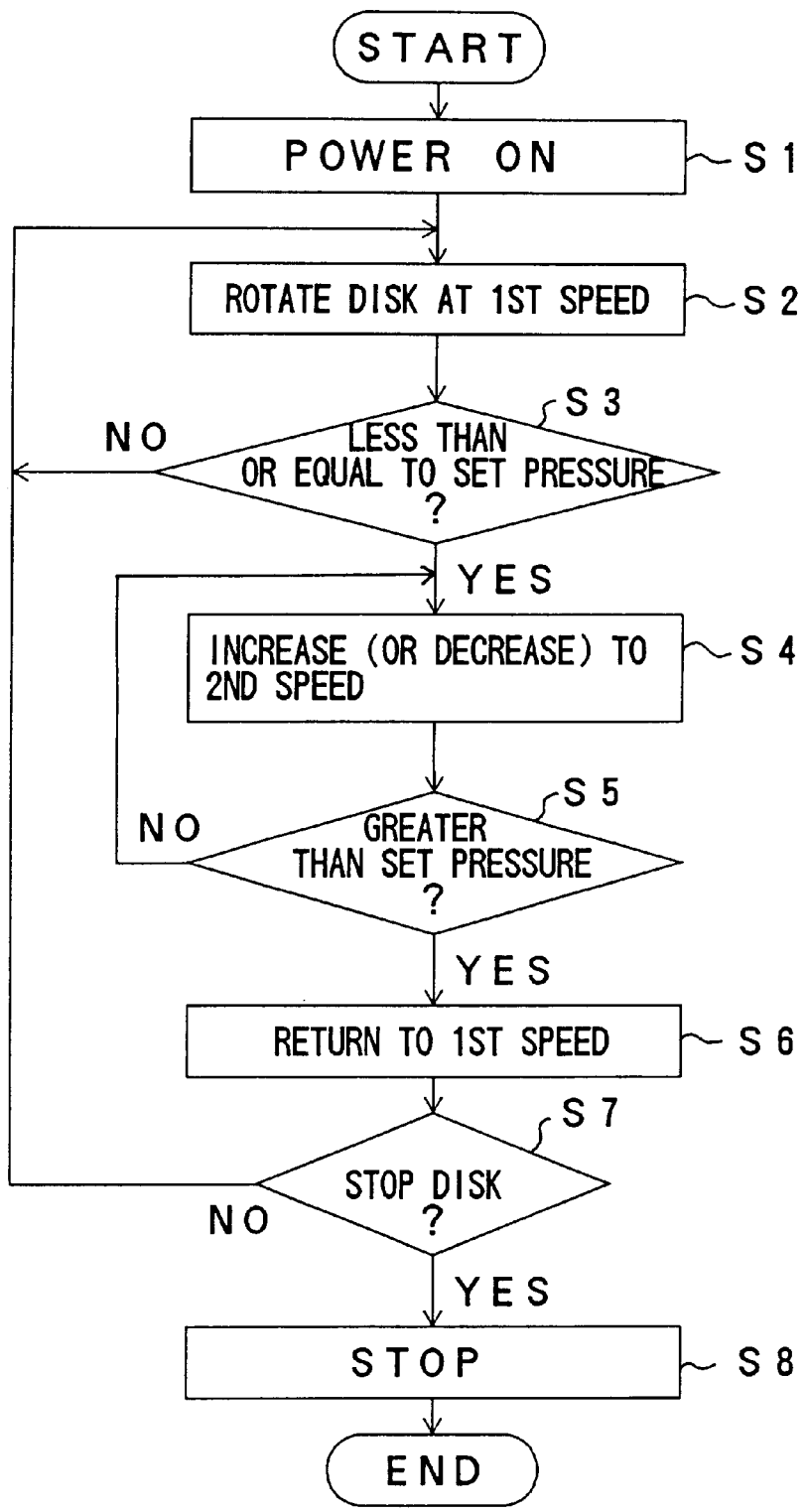
FIG. 3 is a flow chart for explaining the operation of the first embodiment of the disk unit.

Next, a description will be given of this embodiment, by referring to FIG. 3. FIG. 3 is a flow chart for explaining the operation of the MPU 25 in this embodiment.

In FIG. 3, a step S1 turns ON a power supply of the magnetic disk unit, and a step S2 controls the spindle motor 13 via the servo unit 26 so that the magnetic disk 7 rotates regularly at a first rotational speed. The first rotational speed of the magnetic disk 7 during a data write mode or a data read mode is 4500 rpm, for example. In this embodiment, this first rotational speed is the rated rotational speed of the magnetic disk 7. A step S3 decides whether or not an atmospheric pressure indicated by an output detection signal of the barometric sensor of the sensor group 9 is less than or equal to a set atmospheric pressure which is set in advance. The process returns to the step S2 if the decision result in the step S3 is NO. In this embodiment, the set atmospheric pressure is 0.8 atm. on the other hand, if the decision result in the step S3 is YES, a step S4 controls the spindle motor 13 via the servo unit 26 so that the magnetic disk 7 rotates regularly at a second rotational speed which is higher than the first rotational speed. In this embodiment, the second rotational speed is 5400 rpm.

A step S5 decides whether or not the atmospheric pressure indicated by the output detection signal of the barometric sensor of the sensor group 9 is greater than the set atmospheric pressure of 0.8 atm. If the decision result in the step S5 is NO, the process returns to the step S4, and the rotational speed of the magnetic disk 7 is maintained at the second rotational speed. On the other hand, if the decision result in the step S5 is YES, a step S6 controls the spindle motor 13 via the servo unit 26 so that the magnetic disk 7 rotates regularly at the first rotational speed.

A step S7 decides whether or not the power supply of the magnetic disk unit is to be turned OFF to stop operation of the magnetic disk unit, that is, whether or not to stop rotation of the magnetic disk 7, based on an operation end instruction from the host unit 32 instructing the end of the operation of the magnetic disk unit. If the decision result in the step S7 is NO, the process returns to the step S2. On the other hand, if the decision result in the step S7 is YES, a step S8 controls the spindle motor 13 via the servo unit 26 so as to stop the rotation of the magnetic disk 7, and the process ends.

A detection means itself for detecting the rotational speed of the magnetic disk 7 is known, and an illustration and description thereof will be omitted. Based on a signal from the detection means for detecting the rotational speed of the magnetic disk 7, the MPU 25 can constantly be aware of the rotational speed of the magnetic disk 7. For example, the rotational speed of the magnetic disk 7 can be obtained from an interface of indexes within servo information that is reproduced from the magnetic disk 7 by the magnetic head 5.

Therefore, according to this embodiment, the rotational speed of the magnetic disk 7 is increased to the first rotational speed when the atmospheric pressure becomes less than or equal to the set atmospheric pressure. As a result, it is possible to increase a floating distance of the magnetic head 5 from the magnetic disk 7, and to thereby reduce the contact frequency and the contact strength of the magnetic head 5 and the magnetic disk 7.

As a modification of the first embodiment, the step S4 may control the spindle motor 13 via the servo unit 26 so that the magnetic disk 7 rotates at a third rotational speed which is lower than the first rotational speed if the decision result in the step S3 is YES. In this case, the third rotational speed is 3600 rpm, for example.

According to this modification of the first embodiment, the rotational speed of the magnetic disk 7 is decreased from the first rotational speed if the atmospheric pressure becomes less than or equal to the set atmospheric pressure. As a result, although the contact area between the magnetic head 5 and the magnetic disk 7 increases, the damage caused by the contact is reduced, thereby preventing a portion of the magnetic disk 7 from being greatly damaged.

Whether to increase the rotational speed of the magnetic disk 7 as in the first embodiment or, to decrease the rotational speed of the magnetic disk as in the modification of the first embodiment when the atmospheric pressure becomes less than or equal to the set atmospheric pressure, may be determined based on the power consumption of the magnetic disk unit, the rotational performance of the spindle motor 13 and the like.

Next, a description will be given of a second embodiment of the disk unit, by referring to FIG. 4. The basic construction of this second embodiment is basically the same as the basic construction of the first embodiment shown in FIGS. 1 and 2, and thus, a reference will be made to FIGS. 1 and 2 with respect to the construction of this second embodiment. This second embodiment of the magnetic disk unit is applied to a second embodiment of the portable electronic equipment according to the present invention.

In this embodiment, a known touch (or contact) sensor 9a made of a piezoelectric element is provided on the head arm 3 shown in FIG. 1. The touch sensor 9a detects a contact state between the magnetic head 5 and the magnetic disk 7, and outputs a detection signal indicating the contact state. The output detection signal of the touch sensor 9a is supplied to the MPU 25 via the sensor amplifier 28, similarly to the output detection signals of other sensors of the sensor group 9. Hence, the MPU 25 can constantly be aware of the contact state between the magnetic head 5 and the magnetic disk 7.

Figure 4:
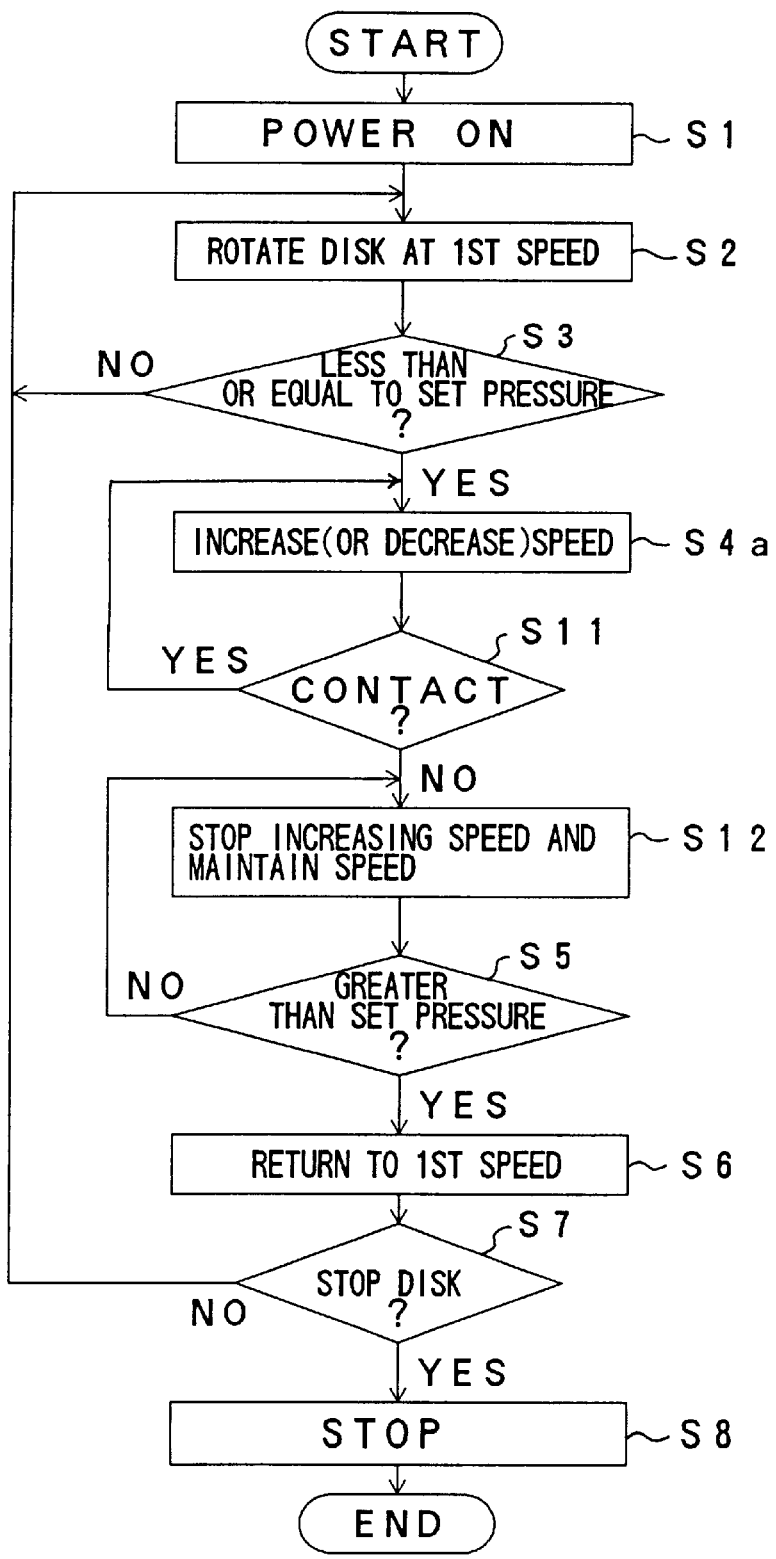
FIG. 4 is a flow chart for explaining the operation of a second embodiment of the disk unit according to the present invention.

FIG. 4 is a flow chart for explaining the operation of the MPU 25 in this embodiment. In FIG. 4, those steps which are the same as those corresponding steps in FIG. 3 are designated by the same reference numerals, and a description thereof will be omitted.

In FIG. 4, a step 4a controls the spindle motor 13 via the servo unit 26 so that the magnetic disk 7 rotates at a rotational speed higher than the first rotational speed. After this step S4a, a step S11 decides whether or not the magnetic head 5 touches the magnetic disk 7 based on the output detection signal of the touch sensor 9a. For example, if a predetermined value corresponds to 150% the white noise value of the output detection signal of the touch sensor 9a, the step S11 decides whether or not the value of the output detection signal of the touch sensor 9a is greater than or equal to this predetermined value.

If the decision result in the step S11 is YES, the process returns to the step S4a. On the other hand, if the decision result in the step S11 is NO, a step S12 controls the spindle motor 13 via the servo unit 26 so that the increasing of the rotational speed of the magnetic disk 7 is discontinued and the rotational speed of the magnetic disk 7 is maintained to a speed such that the value of the output detection signal of the touch sensor 9a is less than 150% the white noise value. The process carried out after the step S12 is the same as that of the first embodiment described above.

In this embodiment, it is possible to automatically control the rotational speed of the magnetic disk 7 so that the magnetic head 5 and the magnetic disk 7 do not make contact, by monitoring the output detection signal of the touch sensor 9a in the MPU 25. In addition, it is also possible to obtain the same effects as the first embodiment described above.

As a modification of this second embodiment, the step S4a may control the spindle motor 13 via the servo unit 26 so that the magnetic disk 7 rotates at a rotational speed lower than the first rotational speed if the decision result in the step S3 is YES. In this case, it is possible to obtain the same effects as the modification of the first embodiment described above.

Figure 5:
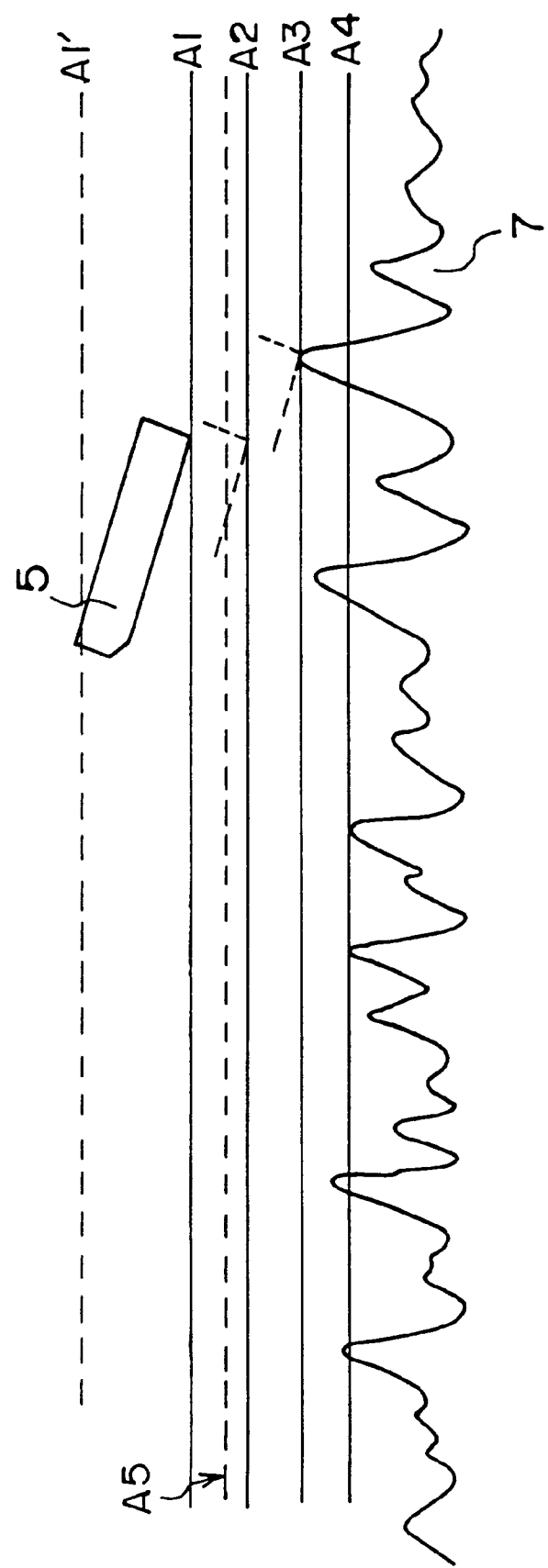
FIG. 5 is a diagram for explaining the relationship between a rotational speed of a magnetic disk and a floating distance of a magnetic head from the magnetic disk.

FIG. 5 is a diagram for explaining the relationship between the rotational speed of the magnetic disk 7 and the floating distance of the magnetic head 5 from the magnetic disk 7.

The floating distance of the magnetic head 5 from the magnetic disk 7 depends on an air pressure lift which is introduced between the magnetic head 5 and the magnetic disk 7 when the magnetic disk 7 rotates. In FIG. 5, the magnetic head 5 is located at a position A1, for example, when the magnetic disk 7 rotates at the rated rotational speed under the operating environment of 1 atm, and the magnetic head 5 is stably floating from the magnetic disk 7 in this state. In this state, when the operating environment changes to 0.9 atm, 0.8 atm and 0.7 atm, the floating distance of the magnetic head 5 from the magnetic disk 7 decreases even if the magnetic disk 7 rotates at the rated rotational speed, and the position of the magnetic head 5 changes to a position A2 at 0.9 atm, to a position A3 at 0.8 atm, and to a position A4 at 0.7 atm. When the magnetic head 5 falls to a position such as the position A3 or A4 in FIG. 5, the magnetic head 5 starts to make contact with high portions of the undulations existing on the surface of the magnetic disk 7.

However, when the rotational speed of the magnetic disk 7 is increased from the rated rotational speed to the first rotational speed as in the first and second embodiments, the partial atmospheric pressure between the magnetic head 5 and the magnetic disk 7 increases. As a result, in a state where the atmospheric pressure is 0.8 atm and the magnetic head 5 is located at the position A3 shown in FIG. 5, for example, the magnetic head 5 floats from the surface of the magnetic disk 7 and rises to a position indicated by a phantom line A5 as the rotational speed of the magnetic disk 7 is increased from the rated rotational speed. Hence, even if the atmospheric pressure decreases in the operating environment in which the magnetic disk unit is used, the floating distance of the magnetic head 5 from the magnetic disk 7 increases as the rotational speed of the magnetic disk 7 increases from the rated rotational speed, thereby reducing the contact frequency and the contact strength of the magnetic head 5 and the magnetic disk 7.

In FIG. 5, a phantom line A1' indicates a position to which the magnetic head 5 rises when the atmospheric pressure of the operating environment is 1 atm and the rotational speed of the magnetic disk 7 is increased from the rated rotational speed to a speed higher than the rated rotational speed in a state where the magnetic head 5 is located at the position A1. This phantom line A1' also indicates a position to which the magnetic head 5 rises when the atmospheric pressure of the operating environment is 0.8 atm and the atmospheric pressure increases to 1 atm in a state where the magnetic disk 7 rotates at a speed higher than the rated rotational speed and the magnetic head 5 is located at the position A5 indicated by the phantom line.

A floating distance FH of the magnetic head 5 from the magnetic disk 7 has an approximately proportional relationship to a peripheral velocity v of the magnetic disk 7, and may be described by FH=av+b, where a and b are constants and the peripheral velocity v is within a practical range of the peripheral velocity.

When the rotational speed is decreased from the first rotational speed as in the modifications of the first and second embodiments, the magnetic head 5 will make contact with the magnetic disk 7. As a result, although the contact area between the magnetic head 5 and the magnetic disk 7 will increase, the damage caused by the contact will be reduced, thereby preventing a portion of the magnetic disk 7 from being greatly damaged.

Next, a description will be given of a third embodiment of the disk unit according to the present invention, by referring to FIG. 6. The basic construction of this third embodiment is basically the same as the basic construction of the first embodiment shown in FIGS. 1 and 2, and thus, a reference will be made to FIGS. 1 and 2 with respect to the construction of this third embodiment. This third embodiment of the magnetic disk unit is applied to a third embodiment of the portable electronic equipment according to the present invention.

Figure 6:
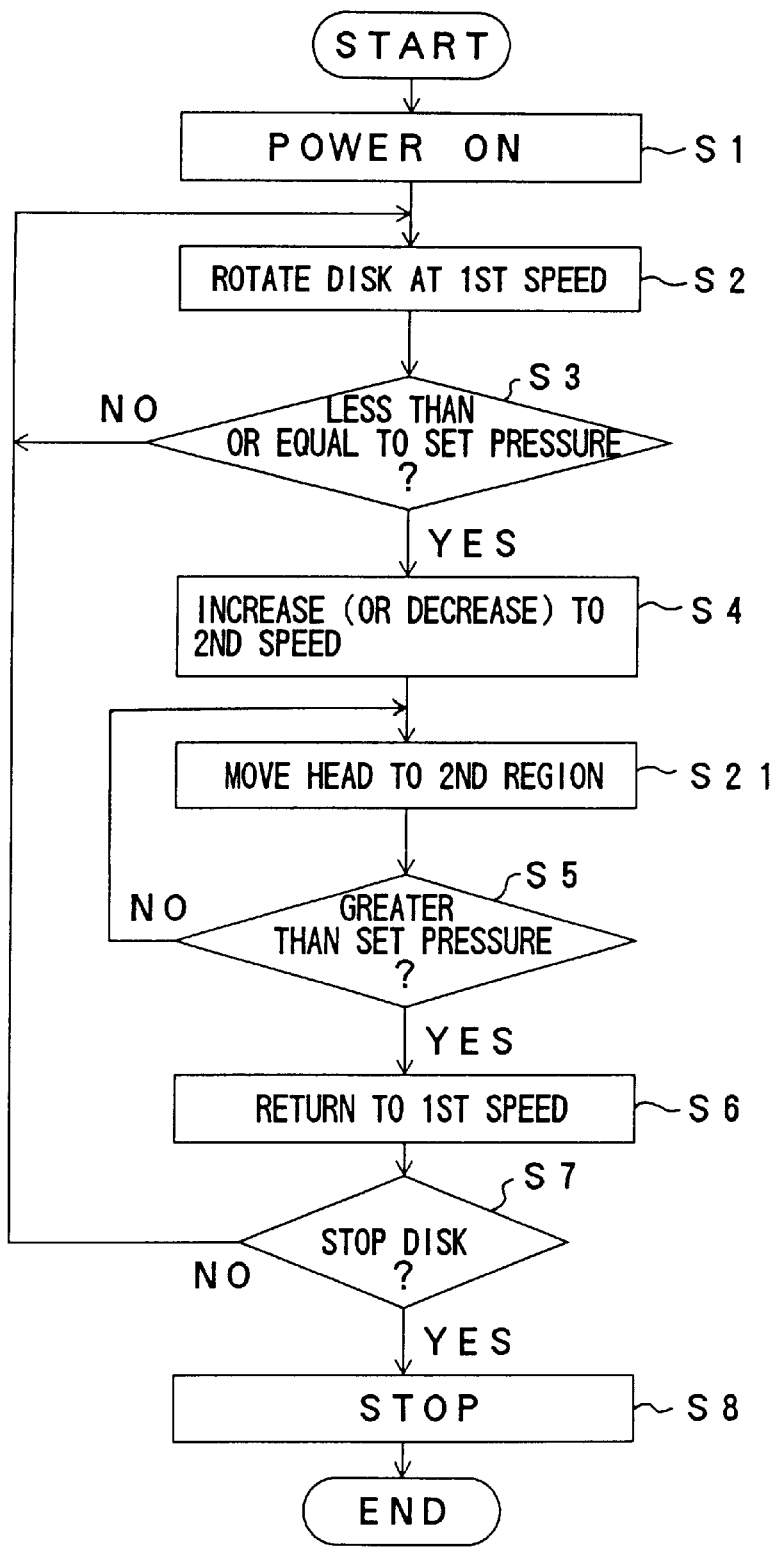
FIG. 6 is a flow chart for explaining the operation of a third embodiment of the disk unit according of the present invention.

FIG. 6 is a flow chart for explaining the operation of the MPU 25 in this embodiment. In FIG. 6, those steps which are the same as those corresponding steps in FIG. 3 are designated by the same reference numerals, and a description thereof will be omitted.

In FIG. 6, after the step S4, a step S21 controls the voice coil motor 12 via the servo unit 26 so as to move the magnetic head 5 by the head arm 3 to a second region on the magnetic disk 7. In this embodiment, a first region and the second region are provided on the magnetic disk 7. The data are written to and read from the first region at a normal transfer rate when the magnetic disk 7 regularly rotates at the first rotational speed described above. On the other hand, the data are written to and read from the second region at a transfer rate identical to the normal transfer rate when the magnetic disk 7 rotates at a second rotational speed which is higher than the first rotational speed. Accordingly, when the magnetic head 5 is moved to the second region of the magnetic disk 7 which rotates at the second rotational speed in the step S21, the data are written to and read from the second region at the transfer rate identical to the normal transfer rate. The process carried out after the step S21 is the same as that of the first embodiment described above.

According to this embodiment, it is possible to reduce the contact frequency and the contact strength of the magnetic head 5 and the magnetic disk 7, and to also prevent damage to the entire region of the magnetic disk due to a decrease in the atmospheric pressure of the operating environment.

In this embodiment, the first and second regions, that is, two kinds of regions, are provided on the magnetic disk 7 because two kinds of rotational speeds, that is, the first and second rotational speeds, are set with respect to the magnetic disk 7. However, if three or more kinds of rotational speeds are set with respect to the magnetic disk 7, the magnetic disk 7 is of course provided with three or more kinds of regions.

In addition, when a magneto-resistive (MR) head is used to reproduce the signal from the magnetic disk, thermal asperity is generated when the MR head contacts the magnetic disk during the signal reproduction, thereby causing noise to become mixed into the reproduced signal and causing electrostatic destruction due to the contact. However, this embodiment can eliminate such noise and electrostatic destruction, so that the serviceable life of both the head and the magnetic disk, that is, the serviceable life of the magnetic disk unit as a whole, is extended.

As a modification of the third embodiment, the step S4 may control the spindle motor 13 via the servo unit 26 so that the magnetic disk 7 rotates at a third rotational speed which is lower than the first rotational speed if the decision result in the step S3 is YES. In this case, it is possible to obtain the same effects as the third embodiment in addition to the effects of the modification of the first embodiment.

Next, a description will be given of a fourth embodiment of the disk unit according to the present invention, by referring to FIG. 7. The basic construction of this fourth embodiment is basically the same as the basic construction of the first embodiment shown in FIGS. 1 and 2, and thus, a reference will be made to FIGS. 1 and 2 with respect to the construction of this fourth embodiment. This fourth embodiment of the magnetic disk unit is applied to a fourth embodiment of the portable electronic equipment according to the present invention.

Figure 7:
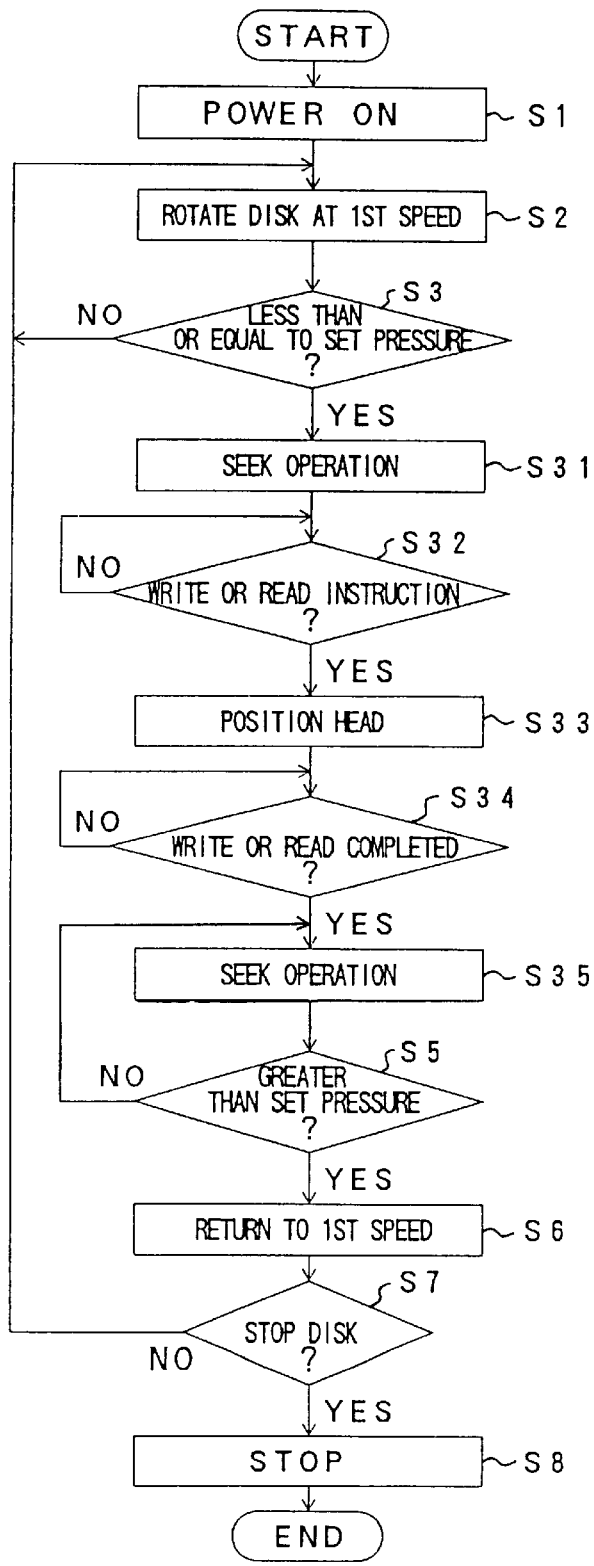
FIG. 7 is a flow chart for explaining the operation of a fourth embodiment of the disk unit according of the present invention.

FIG. 7 is a flow chart for explaining the operation of the MPU 25 in this embodiment. In FIG. 7, those steps which are the same as those corresponding steps in FIG. 3 are designated by the same reference numerals, and a description thereof will be omitted.

In FIG. 7, if the decision result in the step S3 is YES, a step S31 controls the voice coil motor 12 via the servo unit 26 so as to move the magnetic head 5 by the head arm 3 approximately in a radial direction of the magnetic disk 7 and to start a seek operation. In this embodiment, the magnetic head 5 repeats an operation of moving from an innermost peripheral track to an outermost peripheral track of the magnetic disk 7 or vice versa during the seek operation. By this seek operation, the magnetic head 5 moves from one track to an adjacent track on the magnetic disk 7 for every 50 msec, for example. In addition, during the seek operation, the rotational speed of the magnetic disk 7 is increased to the second rotational speed as in the first embodiment or is decreased to the third rotational speed as in the modification of the first embodiment.

A step S32 decides whether or not a write instruction or a read instruction is issued from the host unit 32. If the decision result in the step S32 is YES, a step S33 moves the magnetic head 5 to a target track position on the magnetic disk 7, carries out a head positioning operation, and writes the data to or reads the data from the magnetic disk 7. Since the rotational speed of the magnetic disk 7 is increased to the second rotational speed as in the first embodiment or is decreased to the third rotational speed as in the modification of the first embodiment in this case, the data are written to or read from the magnetic disk 7 after returning the rotational speed of the magnetic disk 7 to the first rotational speed. A step S34 decides whether or not the writing or reading of the data is completed, and a step S35 carries out a seek operation similarly to the step S31 if the decision result in the step S34 is YES. During this seek operation carried out in the step S35, the rotational speed of the magnetic disk 7 is increased to the second rotational speed as in the first embodiment or is decreased to the third rotational speed as in the modification of the first embodiment. The process carried out after the step S35 is the same as that of the first embodiment described above.

The movement of the magnetic head 5 during the seek operation is not limited to the gradual movement described above, and the magnetic head 5 may move several tracks at a time or move at random. However, it is desirable to avoid moving the magnetic head 5 at a high speed not only within a large moving range from the innermost peripheral track to the outermost peripheral track on the magnetic disk 7, but also when moving from one track to an adjacent track.

In addition, when the seek operation is started in the step S31 in FIG. 7, the rotational speed of the magnetic disk 7 is increased to the second rotational speed or is decreased to the third rotational speed, and thus, it is possible to efficiently guarantee the writing and reading of the data by returning the rotational speed of the magnetic disk 7 to the first rotational speed in the later step S6. But when the rotational speed of the magnetic disk 7 is not changed for the seek operation, the step S6 may be omitted. Furthermore, if the floating distance of the magnetic head 5 from the magnetic disk 7 can guarantee the writing and reading of the data even if the rotational speed of the magnetic disk 7 is changed, it is unnecessary to return the rotational speed of the magnetic disk 7 to the original speed every time the writing or reading of the data is carried out, although it may be necessary to control the transfer rate or the like.

According to this embodiment, the portion of the magnetic disk 7 contacted by the magnetic head 5 constantly changes, and it is possible to prevent a specific portion of the magnetic disk 7 from becoming constantly and greatly damaged. Moreover, when the rotational speed of the magnetic disk 7 is increased from the first rotational speed during the seek operation, it is possible to reduce the contact frequency of the magnetic head 5 and the magnetic disk 7.

Next, a description will be given of a fifth embodiment of the disk unit according to the present invention, by referring to FIG. 8. The basic construction of this fifth embodiment is basically the same as the basic construction of the first embodiment shown in FIGS. 1 and 2, and thus, a reference will be made to FIGS. 1 and 2 with respect to the construction of this fifth embodiment. This fifth embodiment of the magnetic disk unit is applied to a fifth embodiment of the portable electronic equipment according to the present invention.

Figure 8:
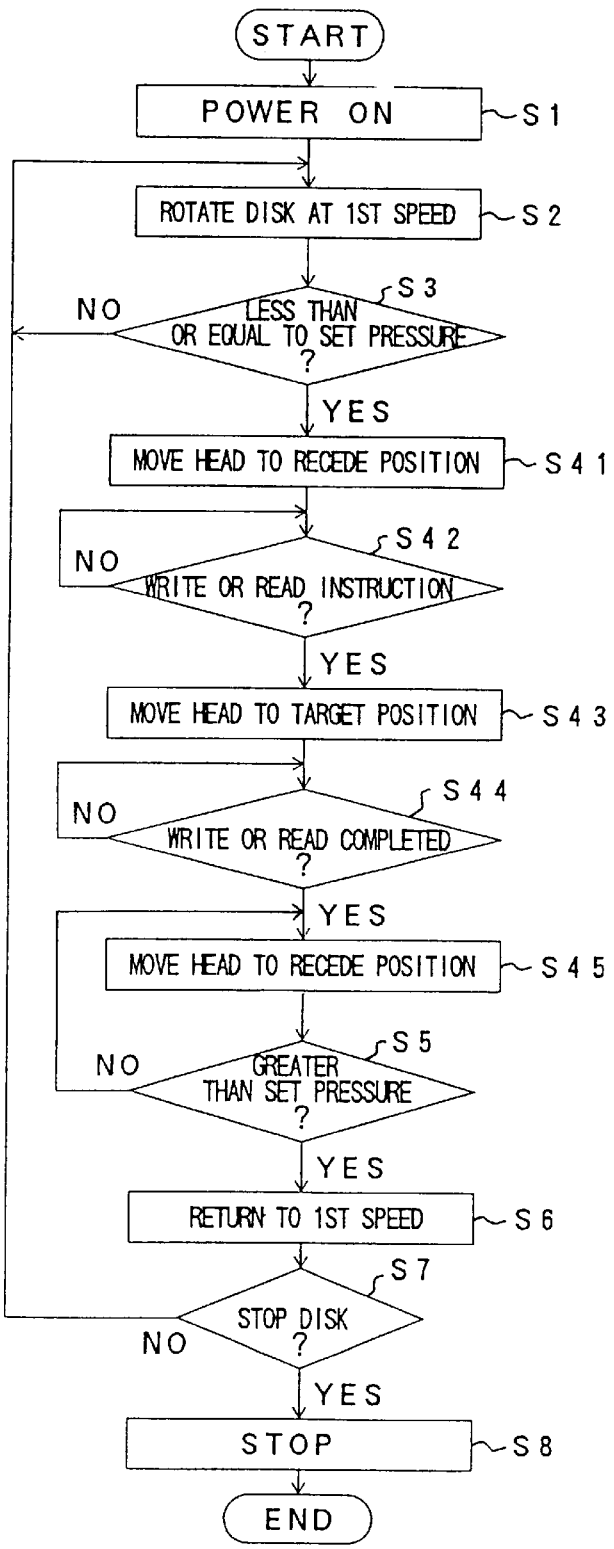
FIG. 8 is a flow chart for explaining the operation of a fifth embodiment of the disk unit according of the present invention.

FIG. 8 is a flow chart for explaining the operation of the MPU 25 in this embodiment. In FIG. 8, those steps which are the same as those corresponding steps in FIG. 3 are designated by the same reference numerals, and a description thereof will be omitted.

In FIG. 8, if the decision result in the step S3 is YES, a step S41 controls the voice coil motor 12 via the servo unit 26 so as to move the magnetic head 5 by the head arm 3 approximately in the radial direction of the magnetic disk 7, so that the magnetic head 5 is moved to a recede position on the magnetic disk 7. The recede position on the magnetic disk 7 is (a) a position where a maximum floating distance of the magnetic head 5 from the magnetic disk 7 is obtained in a floating profile along the radial direction of the magnetic disk 7, (b) a position within a region of the magnetic disk 7 where a protection layer and/or a lubricant layer is thick or, (c) a position within a region of the magnetic disk 7 where the surface smoothness is improved. Furthermore, it is possible to monitor the output detection signal of the touch sensor 9a by the MPU 25 as in the second embodiment described above, and to automatically set, as a recede region which includes the recede position, a region of the magnetic disk 7 here no contact is detected between the magnetic head 5 and the magnetic disk 7.

A step S42 decides whether or not a write instruction or a read instruction is received from the host unit 32, and a step S43 moves the magnetic head 5 to a target position on the magnetic disk 7 if the decision result in the step S42 is YES. A step S44 decides whether the writing or reading of the data is completed, and a step S45 moves the magnetic head 5 to the recede position on the magnetic disk 7 if the decision result in the step S44 is YES.

Of course, the rotational speed of the magnetic disk 7 may be increased to the second rotational speed or decreased to the third rotational speed in the step S41. In this case, it is possible to efficiently guarantee the writing and reading of the data by returning the rotational speed of the magnetic disk 7 to the first rotational speed when writing or reading the data in the step S43. In addition, it is also possible to increase the rotational speed of the magnetic disk 7 to the second rotational speed or to decrease the rotational speed of the magnetic disk 7 to the third rotational speed in the step S45. Further, if the floating distance of the magnetic head 5 from the magnetic disk 7 can guarantee the writing and reading of the data even if the rotational speed of the magnetic disk 7 is changed, it is unnecessary to return the rotational speed of the magnetic disk 7 to the original speed every time the writing or reading of the data is carried out, although it may be necessary to control the transfer rate or the like.

Figure 9:
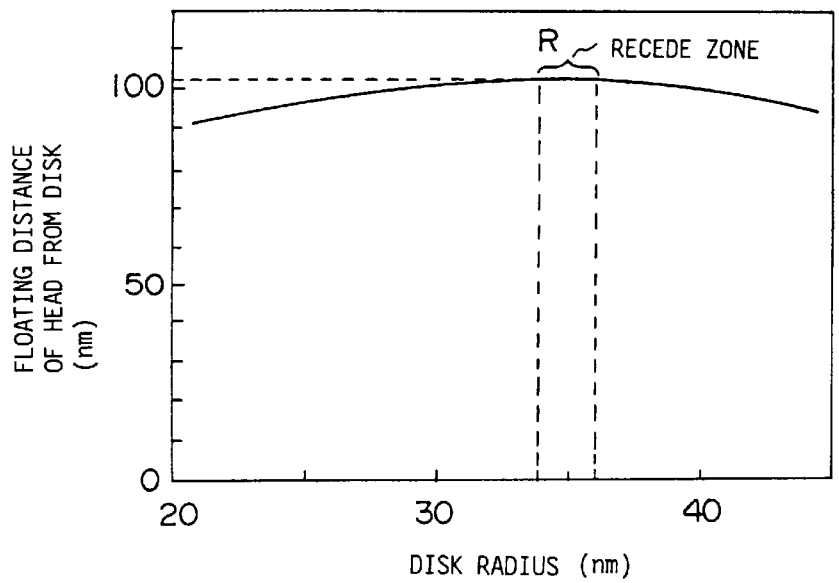
FIG. 9 is a diagram showing a floating profile of the magnetic head along a radial direction of the magnetic disk in the fifth embodiment of the disk unit.

FIG. 9 is a diagram showing a floating profile of the magnetic head 5 along the radial direction of the magnetic disk 7 in this embodiment. In FIG. 9, the ordinate indicates a floating distance (nm) of the magnetic head 5 from the magnetic disk 7, and the abscissa indicates the radial position (mm) from the center of the magnetic disk 7. In this case, a recede zone indicated by R in FIG. 9 corresponds to the recede region which includes the recede position, and the contact frequency of the magnetic head 5 and the magnetic disk 7 is extremely reduced in this recede region.

Figure 10:
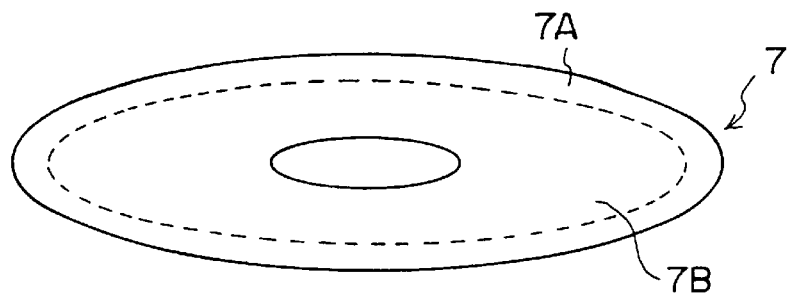
FIG. 10 is a perspective view showing a magnetic disk having a thick protection layer and/or a lubricant layer within a recede region which includes a recede position.

FIG. 10 is a perspective view showing the magnetic disk 7 having a thick protection layer and/or a lubricant layer formed within the recede region which includes the recede position. In FIG. 10, the protection layer and/or the lubricant layer formed in a recede region 7A is thicker than the protection layer and/or the lubricant layer formed in a data recording region 7B, thereby improving the contact withstand characteristic in the recede region 7A. For example, the thickness of the lubricant layer within the data recording region 7B is 10 Å, and the thickness of the lubricant layer within the recede region 7A is 20 Å. In addition, the thickness of the protection layer within the recede region 7A is approximately 1.5 to 2.0 times the thickness of the protection layer within the data recording region 7B, for example.

Figure 11:
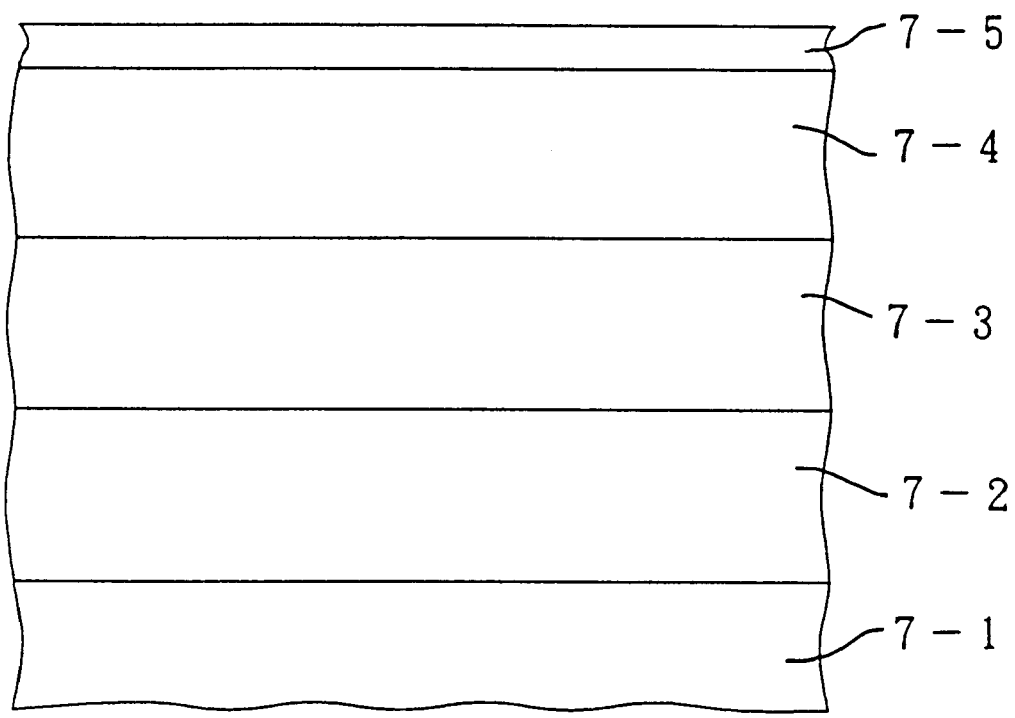
FIG. 11 is a cross sectional view showing a part of the magnetic disk.

FIG. 11 is a cross sectional view showing a part of the magnetic disk 7. The magnetic disk 7 shown in FIG. 11 includes an underlayer 7-2, a recording layer 7-3, a protection layer 7-4 and a lubricant layer 7-5 which are successively formed in this order on a substrate 7-1. Preferable thicknesses of the protection layer 7-4 and the lubricant layer 7-5 within the recede region (specific region) 7A and the data recording region (normal region) 7B are shown in the following Table. The thicknesses of the protection layer 7-4 and the lubricant layer 7-5 depend on the magnetic head 5 which is used and the like. For this reason, the thicknesses of the protection layer 7-4 and the lubricant layer 7-5 are not limited to those shown in the Table, and the thicknesses may be appropriately set to optimum values depending on th e magnetic head 5 and the like.

TABLE

|  | Normal Region 7B | Specific Region 7A |
| --- | --- | --- |
| Thickness of Lubricant Layer 7-5 | 10Å to 15Å | 16Å to 3Å |
| Thickness of Protection Layer 7-4 | 120Å to 200Å | 200Å to 300Å |

In the magnetic disk 7 shown in FIG. 10, the surface smoothness of the recede region 7A may be improved compared to the surface smoothness of the data recording region 7B. In this case, the contact withstand characteristic of the recede region 7A is improved. As a means for improving the surface smoothness of the magnetic disk 7, it is possible to employ a known means such as providing a lubricant layer on the surface of the magnetic disk 7. In this case, in FIG. 9 which shows the floating profile of the magnetic head 5 in the radial direction of the magnetic disk 7, a maximum floating distance Rmax in the recede zone R corresponding to the recede region 7A is set to approximately ⅔ to ½ that in the data recording region 7B, for example.

Next, a description will be given of a sixth embodiment of the disk unit according to the present invention, by referring to FIG. 12. The basic construction of this sixth embodiment is basically the same as the basic construction of the first embodiment shown in FIGS. 1 and 2, and thus, a reference will be made to FIGS. 1 and 2 with respect to the construction of this sixth embodiment. This sixth embodiment of the magnetic disk unit is applied to a sixth embodiment of the portable electronic equipment according to the present invention.

Figure 12:
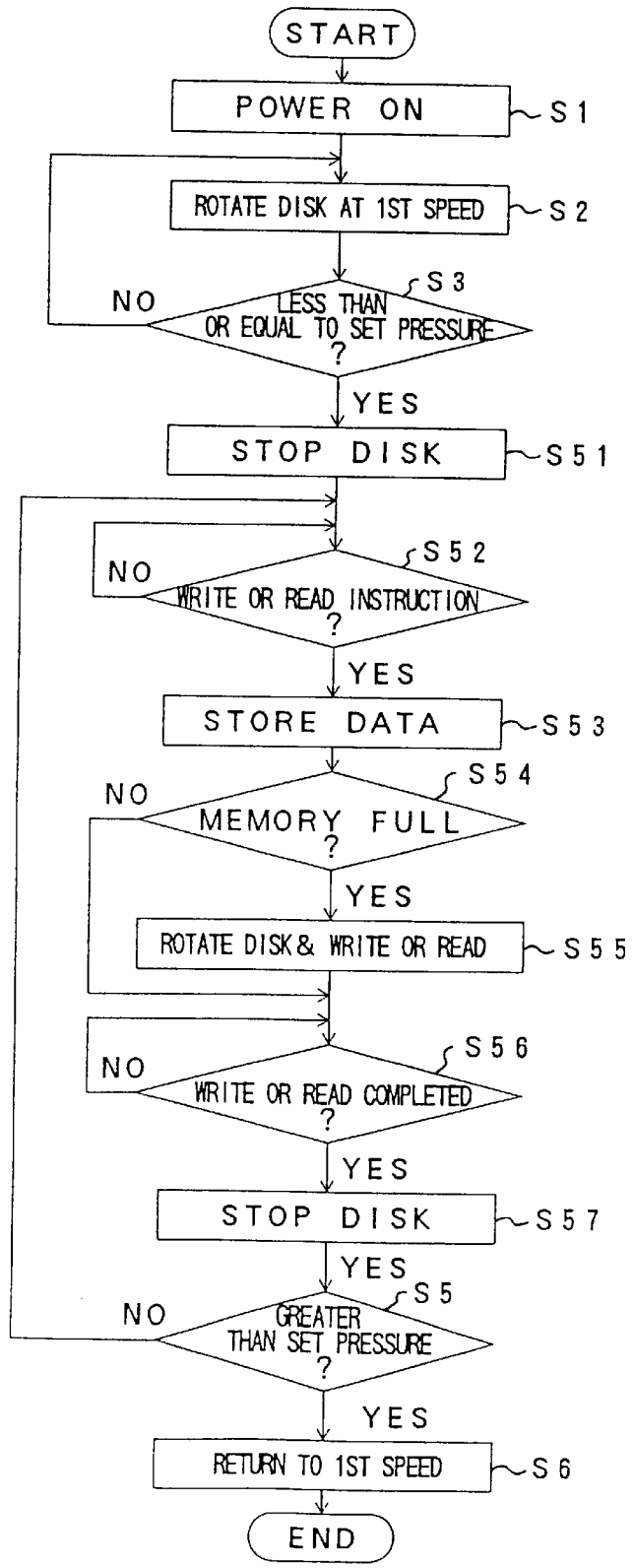
FIG. 12 is a flow chart for explaining the operation of a sixth embodiment of the disk according to the present invention.

FIG. 12 is a flow chart for explaining the operation of the MPU 25 in this embodiment. In FIG. 12, those steps which are the same as those corresponding steps in FIG. 3 are designated by the same reference numerals, and a description thereof will be omitted.

In FIG. 12, if the decision result in the step S3 is YES, a step S51 stops the spindle motor 13 via the servo unit 26 to stop the rotation of the magnetic disk 7, so that the damage to the magnetic head 5 and the magnetic disk 7 caused by the contact is prevented.

A step S52 decides whether or not a data write instruction or a data read instruction is received from the host unit 32. If the decision result in the step S52 is YES, a step S53 temporarily stores the write data to be written to the magnetic disk 7 or the read data read from the magnetic disk 7 in the cache memory 24 shown in FIG. 2. A step S54 decides whether or not the cache memory 24 is full, that is, whether or not the remaining memory capacity of the cache memory 24 is less than a predetermined amount. If the decision result in the step S54 is YES, a step S55 controls the spindle motor 13 via the servo unit 26 so as to rotate the magnetic disk 7 at the first rotational speed, and issues a write instruction or a read instruction related to the magnetic disk 7 so as to write the data to or read the data from the magnetic disk 7. For example, if the write data are stored in the cache memory 24, the write data are read from the cache memory 24 and written to the magnetic disk 7.

On the other hand, if the decision result in the step S54 is NO, the process advances to a step S56. In this case, the step S56 decides whether or not the writing or reading of data with respect to the cache memory 24 is completed. If the decision result in the step S56 is YES, a step S57 stops the rotation of the magnetic disk 7 similarly to the step S51 if the magnetic disk 7 is rotating, and the process advances to the step S5. The process after the step S57 is the same as that of the first embodiment described above, that is, the steps S5 and S6 are carried out.

If the data are written to or read from the magnetic disk 7 in the step S55, the step S56 in this case decides whether or not the writing or reading of data with respect to the magnetic disk 7 is completed. And, if the decision result in the step S56 is YES, the step S57 stops the rotation of the magnetic disk 7 similarly to the step S51, and the process advances to the step S5.

According to this embodiment, the rotation of the magnetic disk 7 is stopped when the atmospheric pressure decreases, so that the data to the magnetic head 5 and the magnetic disk 7 caused by the contact is prevented. In addition, the data reliability is guaranteed because the write data and the read data are temporarily stored in the cache memory 24.

Next, a description will be given of a seventh embodiment of the disk unit according to the present invention, by referring to FIGS. 13 through 15. This seventh embodiment of the magnetic disk unit is applied to a seventh embodiment of the portable electronic equipment according to the present invention.

Figure 13:
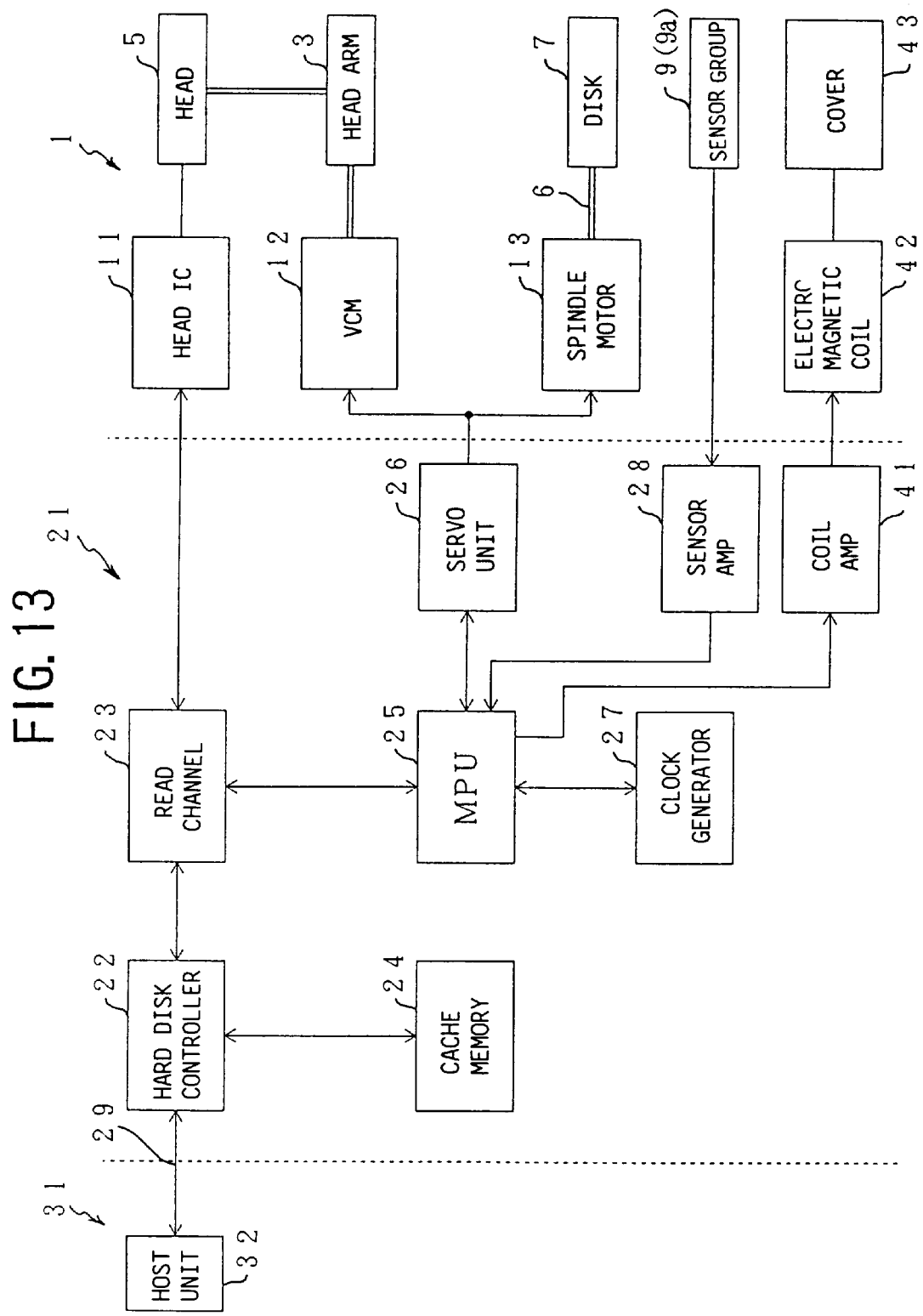
FIG. 13 is a system block diagram showing the construction of the seventh embodiment of the disk unit in more detail.

FIG. 13 is a system block diagram showing the construction of the seventh embodiment of the disk unit. In FIG. 13, those parts which are the same as those corresponding parts in FIG. 2 are designated by the same reference numerals, and a description thereof will be omitted. In the seventh embodiment of the portable electronic equipment, the present invention is applied to a portable personal computer which is often referred to as a lap-top personal computer.

As shown in FIG. 13, this embodiment is additionally provided with a coil amplifier 41, an electromagnetic coil 42 and a breathing hole cover 43. Based on the output detection signal of each sensor of the sensor group 9, that is, based on the environmental change, the MPU 25 supplies a control signal for opening and closing the breathing hole cover 43 to the electromagnetic coil 42 via the coil amplifier 41. The electromagnetic coil 42 opens and closes the breathing hole cover 43 in response to the control signal received from the MPU 25.

Figure 14A:
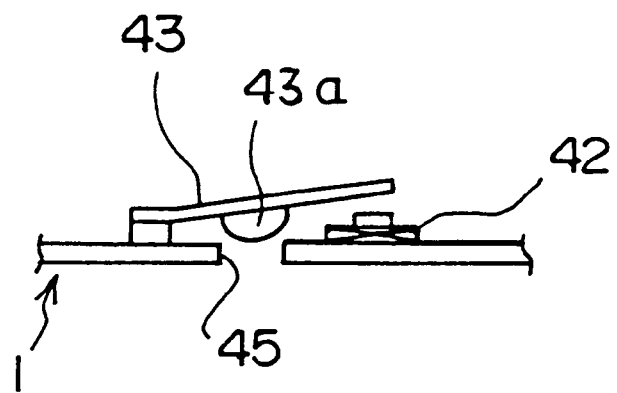
FIGS. 14A and 14B respectively are cross sectional views showing the structure in a vicinity of a breathing hole of a disk enclosure.
Figure 14B:
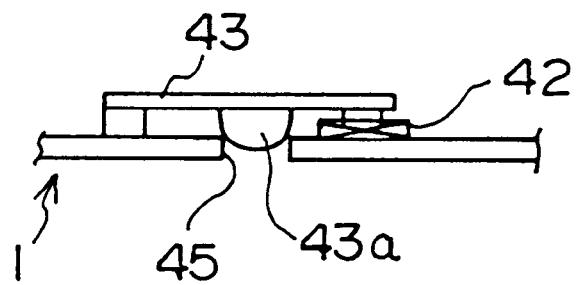

FIGS. 14A and 14B respectively are cross sectional views showing the structure in the vicinity of a breathing hole 45 in the disk enclosure 1. FIG. 14A shows a state where the breathing hole 45 is open, and FIG. 14B shows a state where the breathing hole 45 is closed. For example, the breathing hole cover 43 is made of a metal, and a rubber packing 43a is provided on the breathing hole cover 43. When the electromagnetic coil 42 is energized, the breathing hole cover 43 is attracted towards the electromagnetic coil 42 due to the magnetic force generated by the electromagnetic coil 42, and the breathing hole 45 is completely blocked by the rubber packing 43a.

For example, the structure shown in FIGS. 14A and 14B is provided at a position P shown in FIG. 1. However, the location of the structure shown in FIGS. 14A and 14B is of course not limited to the position P, and the structure may be provided anywhere within the magnetic disk unit as long as the structure does not interfere with the operations of other mechanisms of the magnetic disk unit such as the cover 1a. Of course, the disk enclosure 1 in this embodiment has a known airtight structure which provides a high airtightness.

The breathing hole over 43 need not necessarily be made of a metal, and instead, a member made of a metal may be bonded on the breathing hole cover 43 at a position such that the breathing hole cover 43 is attracted to the electromagnetic coil 42 when the electromagnetic coil 42 is energized.

Figure 15:
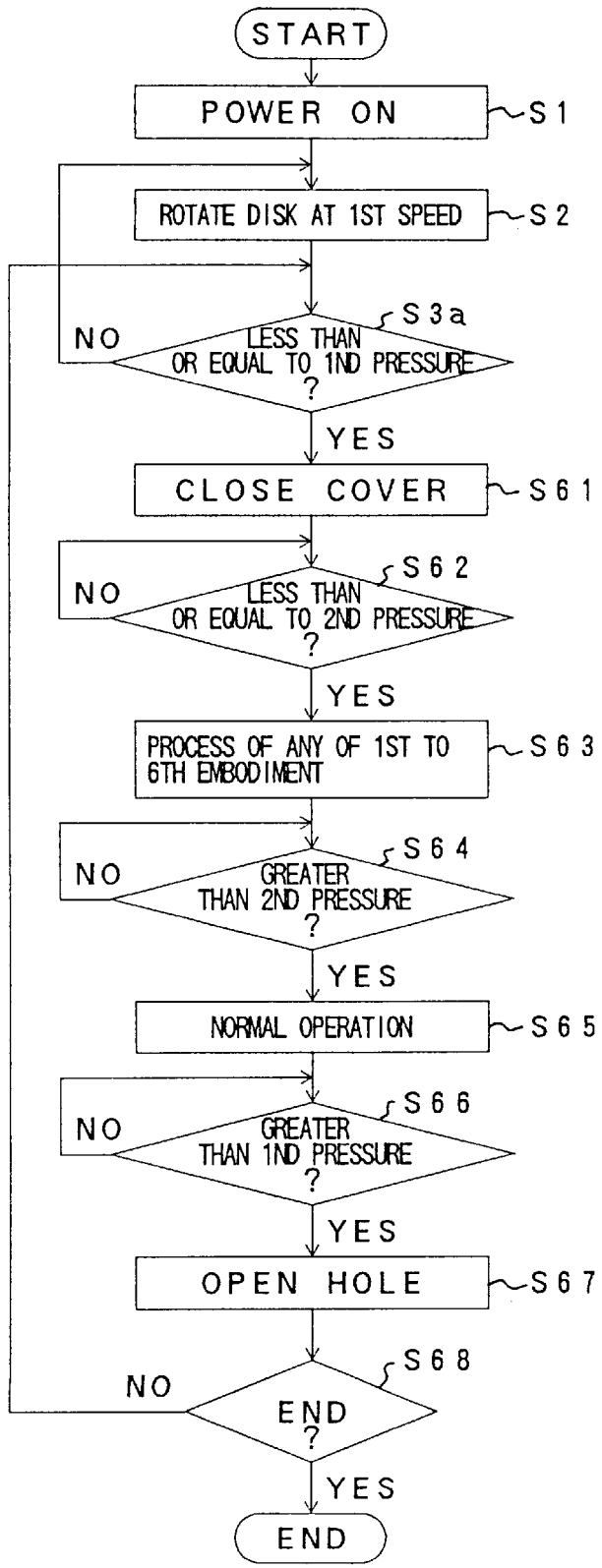
FIG. 15 is a flow chart for explaining the operation of the seventh embodiment of the disk unit.

FIG. 15 is a flow chart for explaining the operation of the MPU 25 in this embodiment. In FIG. 15, those steps which are the same as those corresponding steps in FIG. 3 are designated by the same reference numerals, and a description thereof will be omitted.

In FIG. 15, a step S3a decides whether or not an atmospheric pressure indicated by the output detection signal of the barometric sensor of the sensor group 9 is less than or equal to a first atmospheric pressure which is set in advance. For example, the first atmospheric pressure is 0.95 atm. If the decision result in the step S3a is YES, a step S61 supplies a control signal to energize the electromagnetic coil 42 via the coil amplifier 41, and closes the breathing hole cover 43 to block the breathing hole 45, so that the pressure within the disk enclosure 1 will not decrease any further. In addition, a step S62 decides whether or not the atmospheric pressure indicated by the output detection signal of the barometric sensor of the sensor group 9 is less than or equal to a second atmospheric pressure which is set in advance and is lower than the first atmospheric pressure. For example, the second atmospheric pressure is 0.90 atm. If the decision result in the step S62 is YES, a step S63 suppresses the damage to the magnetic head 5 and the magnetic disk 7 caused by the contact by carrying out the process in conformance with one of the first through sixth embodiments described above.

A step S64 decides whether or not the atmospheric pressure indicated by the output detection signal of the barometric sensor of the sensor group 9 is higher than the second atmospheric pressure. If the decision result in the step S64 is YES, a step S65 returns the operation of the magnetic disk unit to the normal operation in which the magnetic disk 7 regularly rotates at the first rotational speed. For example, if the magnetic disk 7 is rotated at a speed higher than the first rotational speed in the step S63, the step S65 returns the rotational speed of the magnetic disk 7 to the first rotational speed.

In addition, a step S66 decides whether or not the atmospheric pressure indicated by the output detection signal of the barometric sensor of the sensor group 9 is higher than the first atmospheric pressure. If the decision result in the step S66 is YES, a step S67 supplies a control signal to deenergize the electromagnetic coil 42 via the coil amplifier 41, and opens the breathing hole cover 43 to release the breathing hole 45. A step S68 decides whether or not the operation of the magnetic disk unit has ended, based on the instruction received from the host unit 32. The process returns to the step S3a if the decision result in the step S68 is NO, but the power supply of the magnetic disk unit is turned OFF and the process ends if the decision result in the step S68 is YES.

According to this embodiment, it is possible to suppress the damage to the magnetic head 5 and the magnetic disk 7 caused by the contact by suppressing the decrease of the pressure within the disk enclosure 1.

FIG. 16 is a perspective view showing an embodiment of the external appearance of the portable electronic equipment according to the present invention. In FIG. 16, the present invention is applied to a portable personal computer which is often referred to as a lap-top computer or a notebook type computer.

The portable personal computer shown in FIG. 16 includes a main body 500, a display unit 502 provided on a cover 501 which is opened when in use, and a keyboard 503 which is covered when the cover 501 is closed. The magnetic disk unit (disk enclosure) 1 shown in FIG. 1 is loaded into the main body 500, and the main body 500 and the magnetic disk unit 1 are connected via the interface 1f.

of course, the embodiments and modifications described above may be appropriately combined depending on the needs, so as to obtain the desired effects or results.

In each of the above described embodiments, the atmospheric pressure was mainly detected as the environmental parameter. However, similar measures may be take with respect to other environmental parameters such as the temperature and humidity. In addition, a plurality of environmental parameters may be detected so as to take measures against a combination of the environmental parameters.

Further, the present invention is not limited to these embodiments, but various variations and modifications may be made without departing from the scope of the present invention.

What is claimed is:

1. A disk unit comprising:
   a disk enclosure accommodating a disk and having a breathing hole which communicates to outside the disk enclosure;

detection means for detecting an operating environment of the disk unit and outputting a detection signal;

a mechanism opening and closing the breathing hole; and means for controlling said mechanism to close the breathing hole if the detection signal falls outside a first range.

2. The disk unit as claimed in claim 1, which further comprises:

rotation means for rotating the disk; and control means for changing a rotational speed of the disk from a rated rotational speed or stopping rotation of the disk in a state where the breathing hole is closed if the detection signal falls outside a second range.

3. The disk unit as claimed in claim 1, which further comprises:

a head writing data to and/or reading data from the disk;

moving means for moving the head approximately in a radial direction of the disk; and means for controlling said moving means to carry out a seek operation in which the head repeats moving approximately in the radial direction of the disk in a state where the breathing hole is closed if the detection signal falls outside a second range, so that stagnation of the head at the same radial position on the disk is prevented.

4. The disk unit as claimed in claim 1, which further comprises:

a head writing data to and/or reading data from the disk;

moving means for moving the head approximately in a radial direction of the disk; and means for controlling said moving means to recede the head to a predetermined region of the disk during a mode other than a read and a write if the detection signal falls outside a second range.

5. The disk unit as claimed in claim 1, wherein said detection means includes at least one sensor selected from a group consisting of a barometric sensor, a temperature sensor, a humidity sensor, a piezoelectric element, an ultrasonic sensor and a dust sensor.

6. A portable electronic unit comprising:

a display unit;

a keyboard; and a disk unit, said disk unit comprising:

a disk enclosure accommodating a disk and having a breathing hole which communicates to outside the disk enclosure;

detection means for detecting an operating environment of the disk unit and outputting a detection signal;

a mechanism opening and closing the breathing hole; and means for controlling said mechanism to close the breathing hole if the detection signal falls outside a first range.

* * * * *